United States Patent [19]

Majkrzak

[11] Patent Number: 4,805,390
[45] Date of Patent: Feb. 21, 1989

[54] MODULAR SICKLE BAR SECTIONS

[75] Inventor: David S. Majkrzak, West Fargo, N. Dak.

[73] Assignee: Crary Company, Fargo, N. Dak.

[21] Appl. No.: 50,147

[22] Filed: May 14, 1987

[51] Int. Cl.[4] ............................................. A01D 34/14
[52] U.S. Cl. ...................................... 56/300; 403/341
[58] Field of Search ................... 56/300; 403/340, 341

[56] References Cited

U.S. PATENT DOCUMENTS

| | | | |
|---|---|---|---|
| 329,696 | 11/1885 | Barnes | 56/299 |
| 987,716 | 3/1911 | Griffiths | 403/340 |
| 1,233,950 | 7/1917 | Aidlotte | 56/300 |
| 1,340,868 | 5/1920 | Aidlotte | 56/300 |
| 1,896,964 | 2/1933 | Lind | 403/341 |
| 3,664,103 | 5/1972 | McNair | 56/300 |

FOREIGN PATENT DOCUMENTS 1462 of 1876 United Kingdom ................. 56/300

Primary Examiner—Paul J. Hirsch
Attorney, Agent, or Firm—Kinney & Lange

[57] ABSTRACT

A modular knifeback for a sickle knife assembly that is made into lengths that are standardized for permitting ease of shipment, storage and handling, and which lengths can be spliced into a desired extended length knife assemble for use in harvesting machinery, or the like, without sacrificing rigidity and strength where the modular sections are joined together. The modular sections are made sufficiently long so that the bolts or rivets used where the modular sections join are capable of withstanding the loads that are incurred on the knife assembly during use. The modular sections of the sickle are easily kept, and stored, and are assembled using standard components without specialized tools.

7 Claims, 1 Drawing Sheet

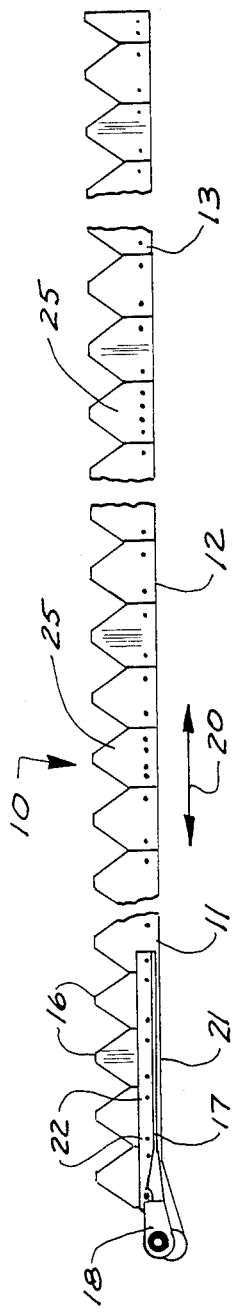
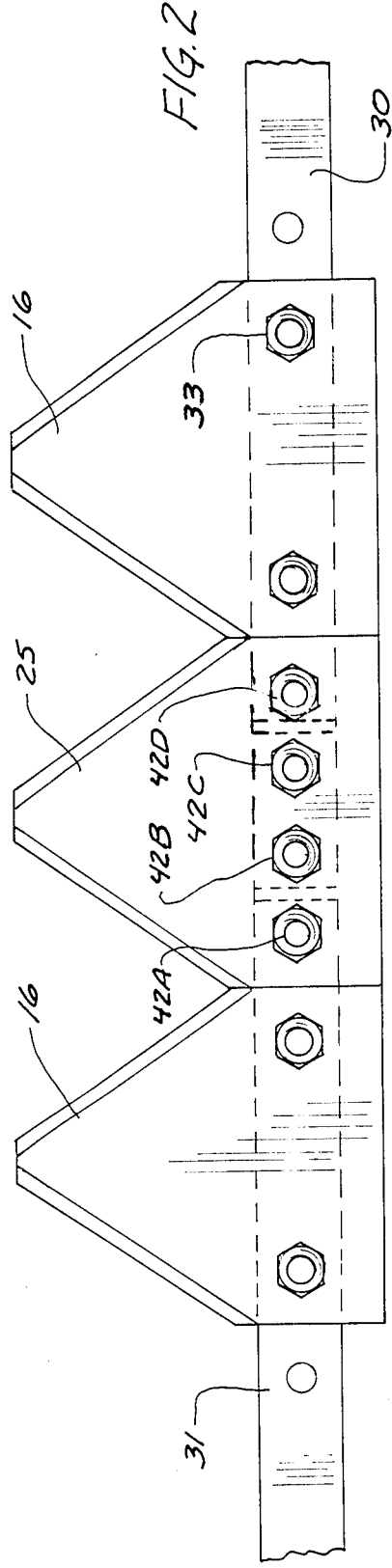
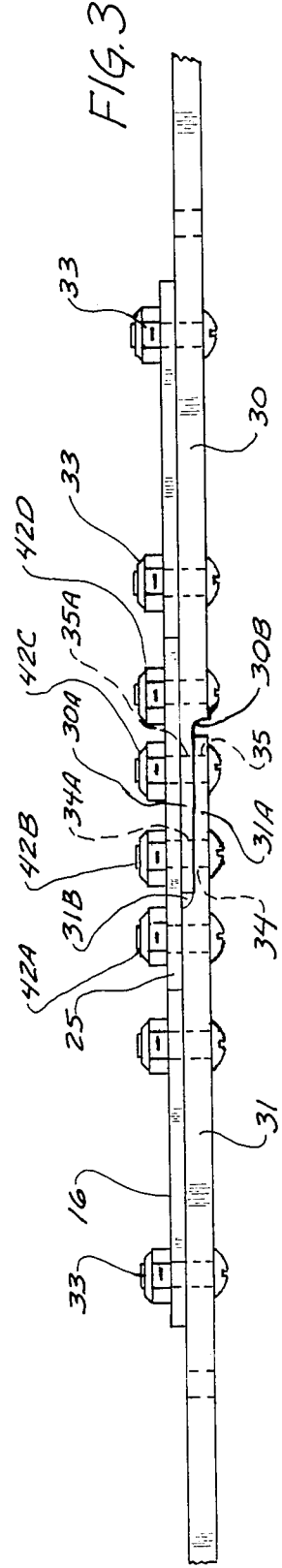

MODULAR SICKLE BAR SECTIONS

BACKGROUND OF THE INVENTION

1. Field of the Invention

The present invention relates to improvements in sickle or knife assembly constructions for argricultural hay and harvesting machinery.

2. Description of the Prior Art

Sickle knife assemblies have been used for cutting hay and standing grain for many years, and generally comprise an elongated knifeback bar that is equal in length to the desired length of the knife assembly to be used, and then a plurality of individual sickle knife sections are usually riveted or bolted to the knifeback bar. The knife assembly is driven at one end with a knife head, and is suitably supported on a sickle bar and reciprocated back and forth for cutting. The loads between the knife sections and the knifeback create shear in the rivets or bolts, and of course the longer the knife assembly, the greater the shear loads that are incurred at the knife head end of the knife assembly. Knife assembly lengths extend into the range of 30 feet or more, and shipment and storage of them becomes a problem. Further, damage to a portion of the knife assembly requires individually replacing the knife sections, which is time consuming.

In the past, there have been sickle knife assemblies that have been made up into a plurality of individual short sections that are joined together to make the elongated assembly. For example, U.S. Pat. No. 1,340,868 shows a knife assembly where short individual portions of lengths of the knifeback are riveted together, with each knifeback portion supporting a single knife section. The junctions between the individual knifeback portions are made so that they interfit in a type of V-notch in one portion and a mating arrowhead end in the mating portion. The V-notches form undercuts that are stress raisers, and with the very short individual portions the rigidity of the knife assembly is reduced substantially.

U.S. Pat. No. 329,696 shows a knife assembly that has short knifeback lengths or portions that have ridged or toothed ends that overlap and then through rivets are used to hold the knifeback portions together. The knifeback portions have a length equal to the width of one knife section. The short knifeback portions are relatively expensive to manufacture, will not easily stay straight during assembly or use, and the individual knifeback portions will tends to rotate slightly relative to each other in the rivet holes so the strength is reduced substantially. The interlocking teeth shown in U.S. Pat. No. 329,696 are difficult to manufacture sufficiently accurately to avoid relative movement between the adjacent knifeback portions in longitudinal direction as the knife assembly is reciprocated. Once there is any movement at all, the knife assembly will hammer itself apart very quickly.

U.S. Pat. No. 1,233,950 also shows a sickle bar or knife assembly made with a plurality of very short long knifeback portions held end-to-end and with backing plates on the side of the knifeback opposite from the knife sections. The knifeback thus has an extra thickness of material on the back side, which requires using flush rivets, that are difficult to get tight, or specialized guards to support the knifeback. This type of device has three rivet shear lines to carry the load, but to be reliable the clamping force and friction between the mating parts at the splice of the knifeback have to be great enough to carry the lengthwise loads and thus with a number of short knifeback portions, particularly ones that form splices adjacent the drive head for the knife assembly, cause problems and early failure.

SUMMARY OF THE INVENTION

The present invention relates to a modular sickle or knife assembly that has a knifeback made into modular units ranging up to a reasonable maximum shipping length for lowest cost shipments. The maximum presently is eight feet. The minimum length used is selected to accommodate the total length of an assembled knife. Long modules are used at the drive end, but the outer end module can be as short as three inches if desired. The knifeback portions of each module have end portions for splicing that are made to provide a high friction load at the splice so that the assembled knifeback bar will carry adequate loads without failure. The individual modules of the knife assembly can be factory made with each of the knife sections attached to the knifeback of the modules in the factory. The modules are shipped and stored conveniently because of their selected length, and are assembled at a dealer or by the farmer into the desired knife assembly length. The modularity also makes it possible to replace individual modules of the knife assembly, thereby reducing down time and simplifying replacing broken or damaged knife sections. The knife assembly as shown uses conventionally-shaped, generally triangular knife sections, but the knife section overlying the splice between modules has extra holes for fasteners. Also, knife sections of various configurations, for example, double point knife sections, can be used.

The modules can be easily shipped and stored, and can be assembled quickly without special tools. Bolts or rivets can be used for assembly, to generate a clamping force at the module splice for functionally carrying the loads that are required for operation of long knife assemblies.

BRIEF DESCRIPTION OF THE DRAWINGS

FIG. 1 is a fully assembled knife assembly having modular sections made according to the present invention, and shown with parts broken away;

FIG. 2 is an enlarged top plan view of a typical splice between modules of the knife assembly shown in FIG. 1; and FIG. 3 is a side elevational view of the portion of the modular knife assembly shown in FIG. 2.

DETAILED DESCRIPTION OF THE PREFERRED EMBODIMENTS

In FIG. 1, a sickle or knife assembly for cutting hay, grain or other crop plants is indicated generally at 10 and is made up of a plurality of sickle modules, for example, a drive head sickle module 11, and intermediate sickle module 12, and an outer end sickle module 13. The knife assembly 10, and each of the sickle modules 11, 12 and 13 are made to be used with conventional knife guards (not shown) and driven from a reciprocating drive pitman or crank. The sickle modules include a standard cross-sectional size knifeback or bar and standard size knife sections, except that in the splice areas between sickle modules, a knife section having additional holes for fasteners for making the splice is provided. The knifeback, as used herein, is the elongated bar member on which the knife sections are mounted, through the use of rivets or bolts.

As shown in FIG. 1, the drive end sickle module 11 has a plurality of standard knife sections 16 thereon, and also has a knife drive head 17 mounted at the end of the sickle bar assembly 10 in a conventional manner. The knife drive head 17 has a drive hub member 18 that is coupled to a reciprocating drive so that the knife assembly is reciprocated back and forth along its longitudinal axis during operation as indicated by the double arrow 20. It should be noted that the knife head 17 has an elongated shank 21 that is attached to the modular sickle section 11 through a substantial number of bolts indicated generally at 22 which are sufficient in number so that the frictional holding force between the shank 21 and the knife sections, and thus with respect to the knifeback, will be adequate to carry the loads needed for reciprocating the knife assembly of the desired length when in use. A substantial number of bolts 22 are needed to provide the friction loading between mating surfaces to transmit the loads encountered in using a long knife assembly.

The intermediate sickle module 12 is coupled to the drive end sickle module 11 at a splice covered by a splice knife section 25, at the end of the intermediate sickle module adjacent the knife head module. The intermediate module 12 is also coupled with a splice knife 25 at its outer end to the outer sickle module 13. The outer sickle module 13 and the intermediate or center sickle module 12 are both of length to have a plurality of knife sections 16 thereon. The drive head module will be long preferably, and so will the intermediate modules. These long modules will be between six and eight feet. For example, sickle modules in six, seven and eight foot lengths can be utilized, and the outer or end sickle modules 13 and drive head modules 11 will be separately constructed from the center sickle modules 12, which can be universal and used with different types of outer or knife head modules. The outer module 13 will usually have a half knife section at its outer end as shown in FIG. 1. Half knife sections can be at either end of the knife assembly. The end module can be made very short and can be selected so when a long drive end module and a reasonable length second module is used, the outer module will provide the desired overall length of the knife assembly.

The junction or splice knife sections 25 overlie the splices of the adjacent individual sickle modules, and as shown in FIGS. 2 and 3, the knife sections 16 are preassembled and mounted onto knifeback portions 30 and 31, respectively. The knifeback portion 31 forms the outer end of the drive sickle module 11, as shown, and the knifeback portion 30 forms the knifeback for the intermediate sickle module 12. These knifeback portions 30 and 31 each have an integral splice plate 30A and 31A, respectively, formed therein as can be seen in FIG. 3. The splice plates are made by reducing the thickness of the knifeback to one-half the normal thickness and making the splice plate portions complemental so the splice plates form overlapping splice portions. When the splice plates are overlapped, one on top of the other, the total thickness of the knifeback in the splice area is equal to that of the individual knifeback portions 30 and 31. The integral splice plates 30A and 31A join with the main parts of the knifeback portions through smooth radius junction areas 30B and 31B, respectively, so there are no sharp corners that result in stress raisers at the splices.

The individual sickle modules are factory fabricated, as stated, with the knife sections 16 fastened onto the respective knifeback portions through the use of fasteners such as bolts indicated at 33, or with suitable rivets, as desired. The sickle modules are preferably factory assembled for reduced costs, and when the individual sickle modules are to be joined together, the complemental splice plates formed at the adjoining ends of the knifeback portions 30 and 31 are overlapped, so that openings indicated at 34 and 35 in the splice plate 31A, and at 34A and 35A in the junction plate 30A, align. The knifeback portions 30 and 31 are placed along a straight edge to make sure that the knife assembly is straight. Then, a splice knife section 25, which has four openings or holes therein, as shown, is placed over the overlapped splice plates. The four holes in the knife section 25 are made so that two outer holes are the same spacing as the holes for receiving bolts in the standard knife section 16, and two center holes align with, overlie, and provide for placing fasteners through the holes 34, 34A and 35, 35A. The fasteners can be suitable bolts that are placed through these openings and secured. These bolts or rivets 42A-42D can be the same as the standard bolts or rivets 33.

The assembly of the two sickle modules is then completed. All that is necessary is to place the modules with the integral splice plates overlapping, straighten the modules longitudinally, put a splice knife section in place, and put in four fasteners, such as bolts, through the splice knife section 25 and aligning splice plate openings.

The overlapping of the splice plates 30A and 31A provides a substantial area of mating normally flat surfaces which are frictionally held together by the splice bolts 42B and 42C. The surfaces which mate can be milled rough, roughened or knurled for added holding power. It can be seen that because the splice knife section 25 has separate bolts 42A and 42D in the respective knifeback portions 30 and 31, as well as two bolts 42B and 42C that pass through the splice plates, any shear loads will be carried through five shear surfaces of the bolts. In other words, assuming that the drive load is on the knifeback portion 31, the shear load is carried through a shear surface of the bolt 42A passing through one hole, in knifeback portion 31 and the hole of splice knife section 25 adjacent the knife head and through two shear surfaces on each of the splice plate bolts shown at 42B and 42C. The longitudinal reciprocating load carrying capability of the splice is kept high because the surface area for friction forces resisting longitudinal axial loads is substantial between the mating surfaces of the overlapping splice plates. The knifeback portions 30 and 31 are the same cross-sectional size as the standard knifeback, and the ability to carry necessary loads indicated by the double arrow 20 is maintained.

The splice knife section overlapping the splice, also helps to strengthen the splice. For example, the breakage of a knifeback is most likely to occur where the splice plates 30A and 31A from the main knifeback portions or across one of the holes in the splice plates. If the knifeback fails at its junction with a splice plate, for example, its region 30B, bolt 42D will have to shear as well, because splice knife section 25 spans the region 30B. If failure in splice plate 30A occurs, across hole 35A, for example, bolt 42D again will have to shear and thus additional load carrying ability is provided by the splice knife section and its fasteners.

Another feature of having long sickle modules at the drive end (as long as permissible shipping length) is that the very high loads that are carried by the knife head 17, which are proportional to the length of the knife assembly for a given cutting condition, reduce as a function of distance from the knife head, so that at the outer end of the drive sickle module 11, the longitudinal loads on the knifeback have been reduced..If, for example, the first splice is 8 feet from the drive head, on a 16 foot sickle bar assembly, the load at the splice between the outer sickle module to the drive sickle module would only be one-half of the load carried by the knife head. Thus, the splice strength not only is increased over the prior art, but the loads are reduced at the splice over the types of knife assemblies shown in the prior art where very short, individual knifeback portions are used. Rigidity also is substantially increased because the splice plates have mating, longitudinally extending generally flat surfaces which can be tightly clamped together. There are three or more splices in a very long knife assembly.

Although the present invention has been described with reference to preferred embodiments, workers skilled in the art will recognize that changes may be made in form and detail without departing from the spirit and scope of the invention.

What is claimed is:

1. A modular sickle knife assembly comprising at least first and second sickle modules, each sickle module comprising a knifeback portion having a longitudinal length and a plurality of knife sections mounted on each of the sickle modules, and said sickle modules each having splice forming means on at least one end thereof for splicing adjacent sickle modules together, said splice forming means comprising complemental splice plates integral with each of the knifeback portions and having a radiused surface formed where the splice plate joins the respective knifeback portion and a shoulder surface generally perpendicular to the splice plate being formed at the junction with the respective knifeback portions and joining the radiused surface, said splice plates overlapping each other at the splice in direction of the longitudinal length, said splice plates having aligning openings when positioned overlapped to form a sickle knife assembly and each splice plate having an end spaced in longitudinal direction from the shoulder surface of other knifeback portion when the openings in the splice plates are aligned, a splice knife section having a plurality of openings greater than two passing through the splice knife section, said openings in the splice knife section, including separate openings in each end of the splice knife section, each of which separate openings aligns with openings through a separate one of the separate knifeback portions of the adjacent sickle modules other than openings in the splice plates, and said openings in the splice knife section including at least one opening aligning with the aligning openings of the overlapping splice plates, and fastening means in each of the openings of the splice knife section to fasten the splice knife section to the knifeback portions and splice plates of the two modules being joined.

2. The knife assembly of claim 1 wherein said splice knife section has four openings therethrough and said splice plates have at least two openings therethrough, which align with two openings in the center portion of the splice knife section, and the fastening means in said two openings in the splice plates frictionally clamping the splice plates together.

3. The knife assembly of claim 2 wherein said splice plates have substantially flat surfaces which are complemental and face each other, said flat surfaces being clamped together by said fastener means to provide a friction force resisting movements in longitudinal direction substantially parallel to the flat surfaces.

4. The knife assembly of claim 1 wherein there are at least first, second and third sickle modules, with substantially identical splice means between adjacent sickle modules.

5. A modular sickle knife assembly comprising at least first and second sickle modules, each such sickle module comprising a knifeback portion having a longitudinal length such that there are a plurality of knife sections mounted on each of the sickle modules, and the knifeback portions of said sickle modules each having a main portion and a splice plate on at least one end thereof for splicing two sickle modules together, said splice plates being reduced in height to substantially one-half the height of the main portions of the knifeback portions to form shoulder surfaces on the knifeback portions which are joined to the respective splice plates by radius fillets to reduce stress concentration, and the splice plates having outer end surfaces at the opposite end of the splice plates from the respective shoulder surfaces, whereby the splice plates of two knifeback portions can be overlapped with the end surfaces of each splice plate spaced longitudinally from the shoulder surface of the other splice plate, said splice plates each having at least two holes therethrough which align with holes in the mating overlapped splice plate and said main knifeback portions of the two sickle modules to be joined each having an opening therethrough adjacent said splice plate portions, so when the splice plates are overlapped there are four adjacent openings including two aligned in the overlapping splice plates and one in each of the adjacent main portions of the knifeback portions being spliced and the four openings being spaced within a length equal to the width of a standard knife section for such sickle modules, a splice knife section of standard width, having four openings therethrough positioned over the mated splice plates of the knifeback portions of adjacent sickle modules and having the knife section openings aligned with the four adjacent openings at the splice being formed, and fasteners in at least two aligning openings in the splice plate portions, and in one opening in each of the main portions of knifeback portions of the respective sickle modules being spliced and passing through the four openings of the splice knife section to clamp the splice plates together.

6. The assembly of claim 5 wherein the sickle modules range in length up to about eight feet.

7. The assembly of claim 5 wherein one of the sickle modules comprises of a drive end module and wherein the drive end module is of a length in the range of eight feet.

* * * * *